Figure 1:
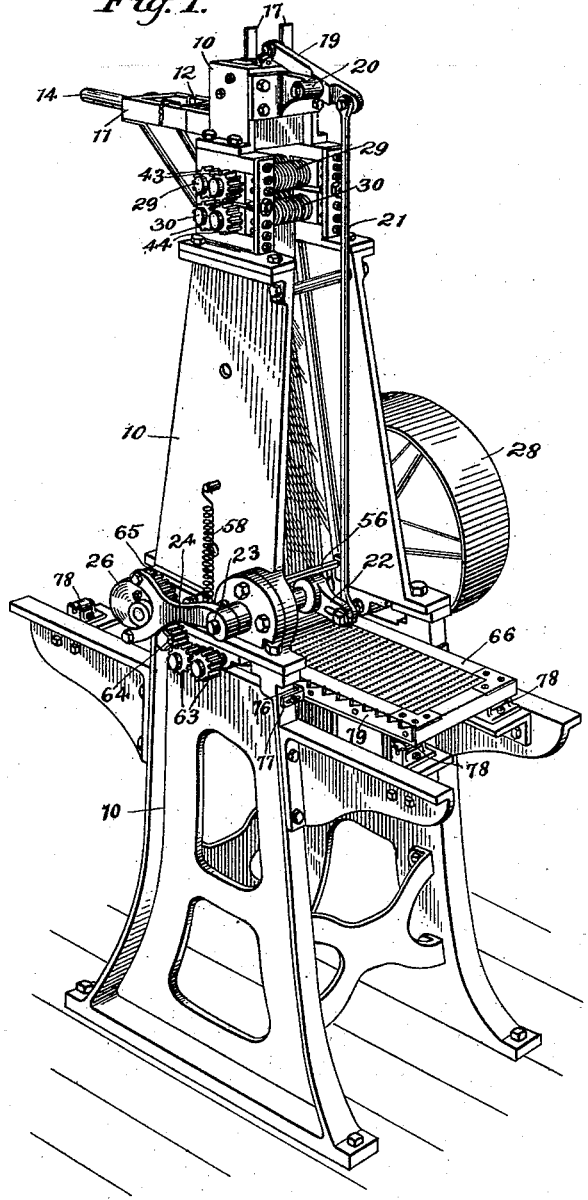

No. 622,998. Patented Apr. 11, 1899.
W. A. DOWNS.
MATCH MACHINE.
(Application filed Jan. 19, 1899.)

(No Model.) 4 Sheets—Sheet 1.

WITNESSES:
H. T. Criswell
J. G. Dunbar

INVENTOR
Wallace A. Downs,
BY
Hutchinson & Criswell,
ATTORNEYS.

No. 622,998. Patented Apr. 11, 1899.
W. A. DOWNS.
MATCH MACHINE.
(Application filed Jan. 19, 1899.)
(No Model.) 4 Sheets—Sheet 2.
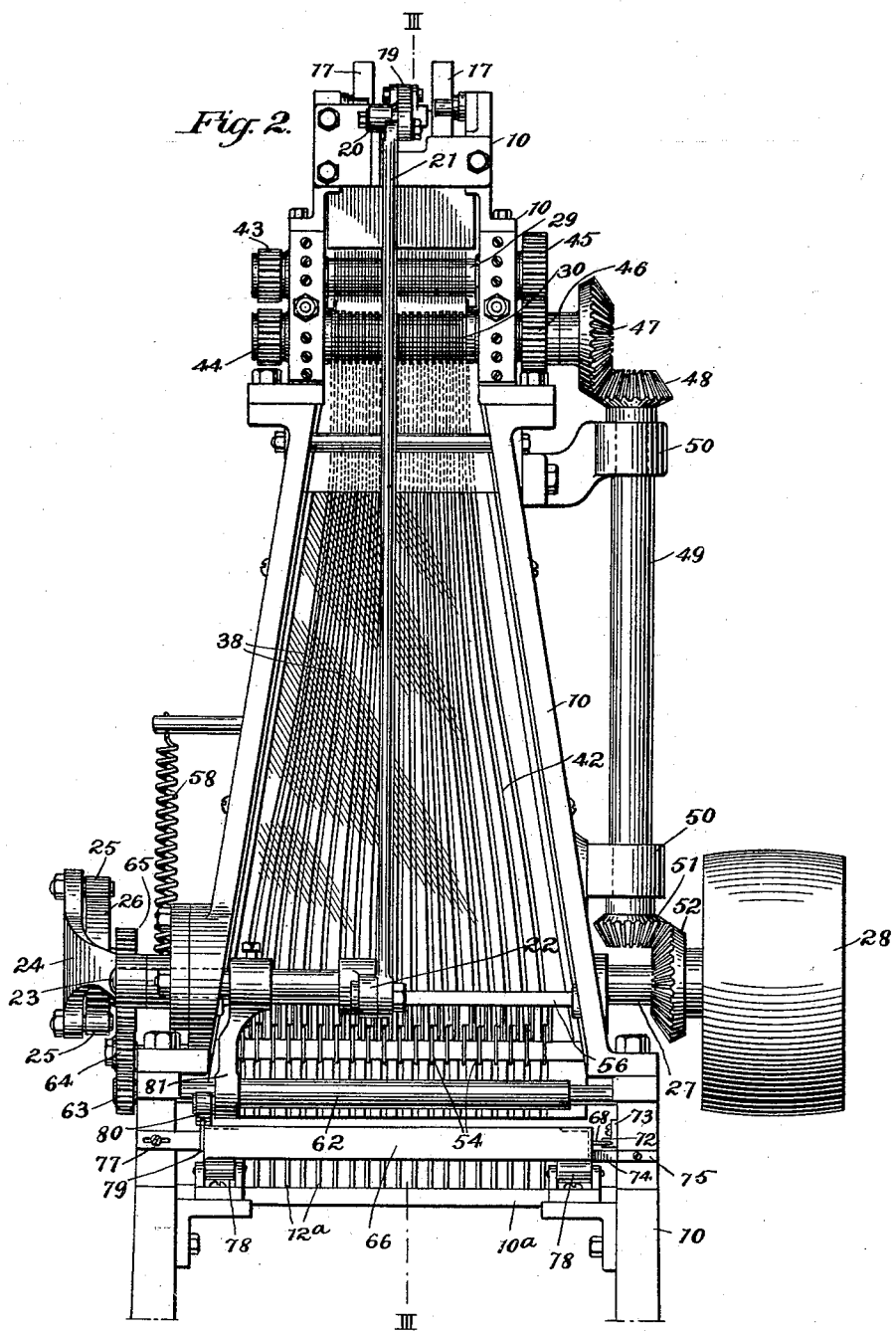
WITNESSES:
N. T. Criswell
J. D. Dunbar
INVENTOR
Wallace A. Downs
BY
Hutchinson & Criswell.
ATTORNEYS.

No. 622,998. Patented Apr. 11, 1899.
W. A. DOWNS.
MATCH MACHINE.
(Application filed Jan. 19, 1899.)
(No Model.) 4 Sheets—Sheet 3.
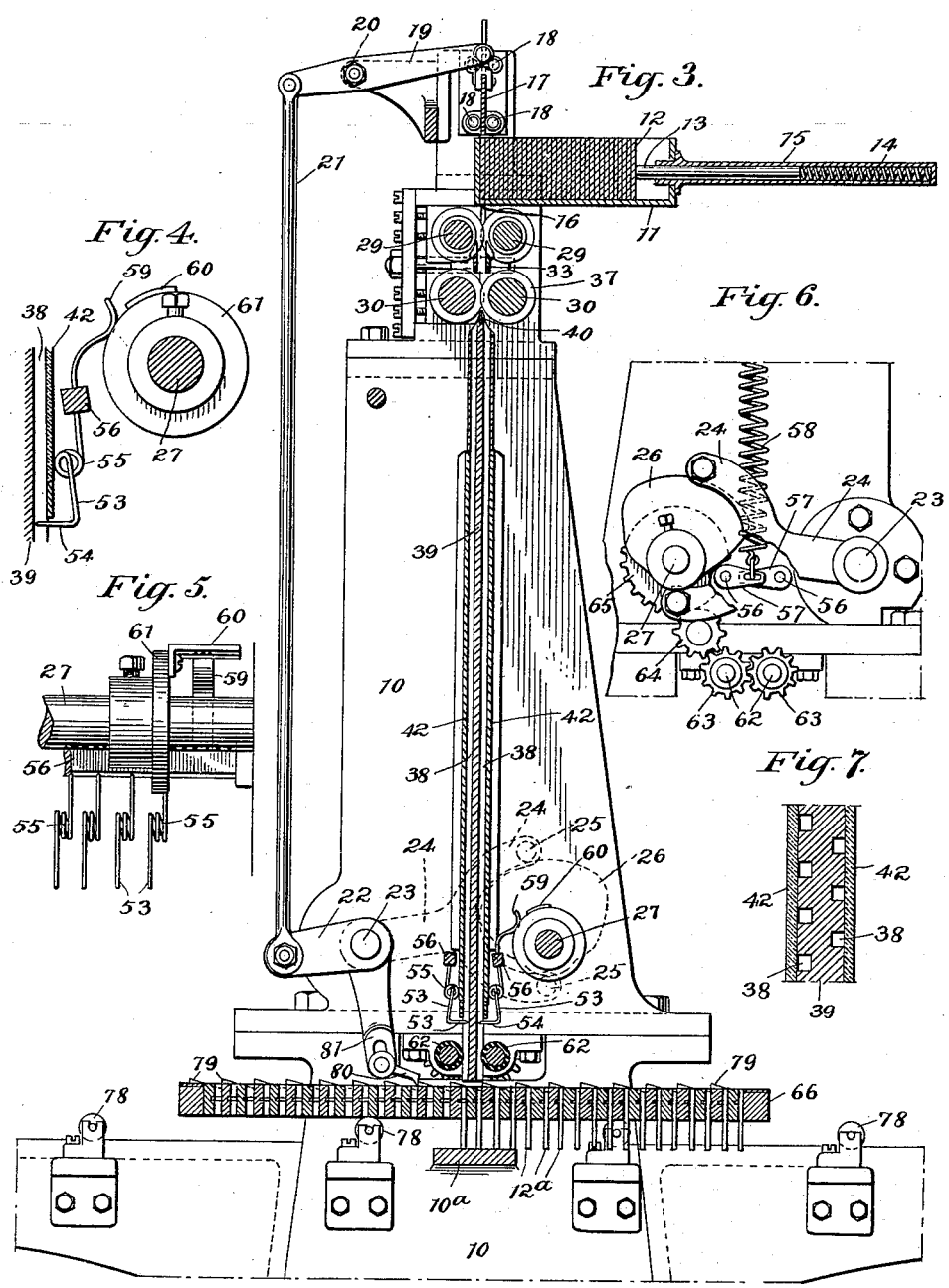
WITNESSES:
W. T. Criswell
J. G. Dunbar
INVENTOR
Wallace A. Downs
BY
Hutchinson & Criswell,
ATTORNEYS.

No. 622,998. Patented Apr. 11, 1899.
W. A. DOWNS.
MATCH MACHINE.
(Application filed Jan. 19, 1899.)
(No Model.) 4 Sheets—Sheet 4.
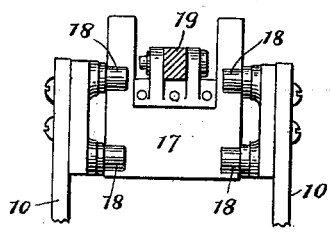
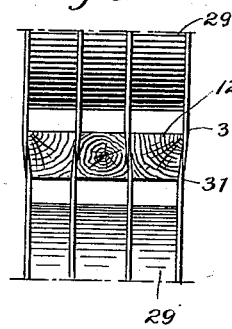
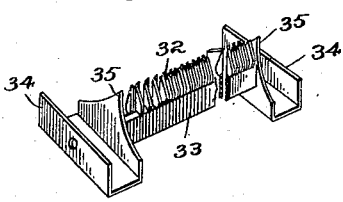
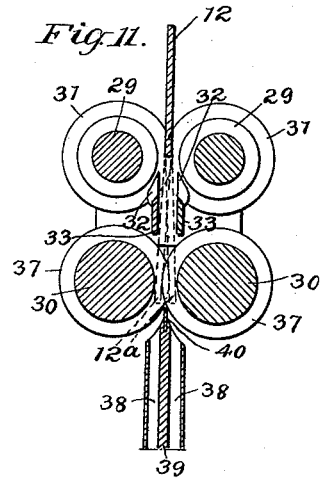
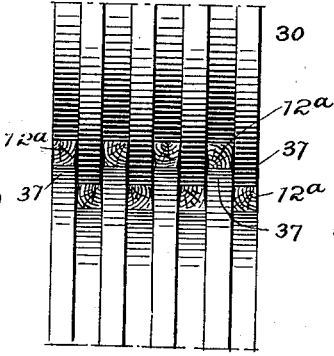
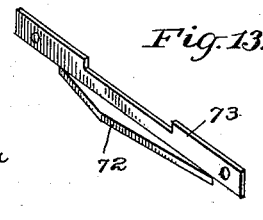
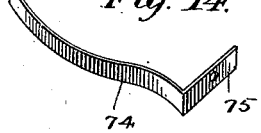
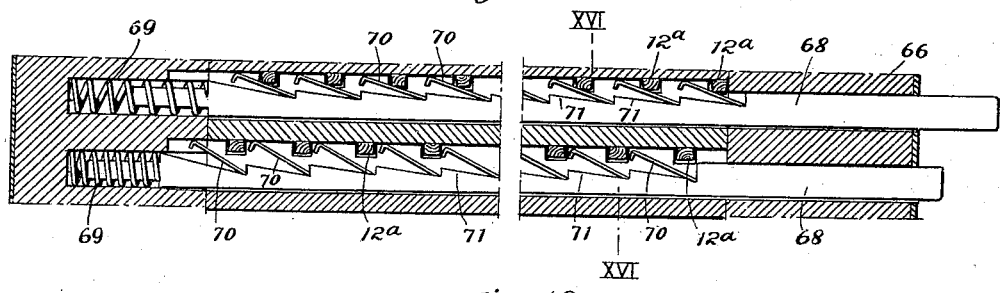
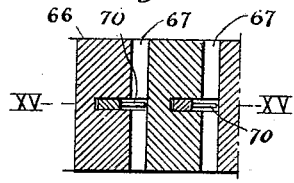
WITNESSES:
H. T. Criswell
J. G. Dunbar
INVENTOR
Wallace A. Downs
BY
Hutchinson & Criswell
ATTORNEYS.

UNITED STATES PATENT OFFICE.

WALLACE A. DOWNS, OF NEW YORK, N. Y., ASSIGNOR TO THE INTERNATIONAL MACHINE COMPANY, OF JERSEY CITY, NEW JERSEY.

MATCH-MACHINE.

SPECIFICATION forming part of Letters Patent No. 622,998, dated April 11, 1899.

Application filed January 19, 1899. Serial No. 702,717. (No model.)

*To all whom it may concern:*

Be it known that I, WALLACE A. DOWNS, of New York, in the county and State of New York, have invented certain new and useful Improvements in Match-Machines, of which the following is a full, clear, and exact description.

My invention relates to improvements in match-machines, and especially to that class of machines in which the matches are formed of strips of veneer and the matches cut and automatically delivered into holding-frames, where they may be dipped in the phosphorous composition either automatically or otherwise.

The object of my invention is to produce a relatively cheap and simple machine of this character which is adapted to use up the smallest strips of veneer such as usually go to waste, which is arranged to work very rapidly, and which works with absolutely no waste, which cuts clean splints and automatically delivers them to a holding device in which they may be dipped, and in general to produce a compact practical machine which works sufficiently well to lessen the cost of the manufactured match.

To these ends my invention consists of a match-making machine the construction and organization of which will be hereinafter fully described and claimed.

Reference is to be had to the accompanying drawings, forming a part of this specification, in which similar figures of reference indicate corresponding parts in all the views.

Figure 1 is a perspective view of the match-machine embodying my invention. Fig. 2 is an enlarged front elevation of the upper part of the machine. Fig. 3 is a vertical section on the line III III of Fig. 2. Fig. 4 is a sectional side elevation of the finger mechanism for regulating the dropping of splints through the chutes or magazine. Fig. 5 is a broken front elevation of the said mechanism. Fig. 6 is a broken enlarged side elevation of certain details for operating the splint-feed rolls and other parts of the machine. Fig. 7 is a broken cross-section through the chutes or magazine. Fig. 8 is a sectional elevation, on an enlarged scale, of the plunger for feeding the veneer strips to the cutting-rolls. Fig. 9 is a broken enlarged detail plan of the splint-knives. Fig. 10 is a broken enlarged perspective view of the stripping device which prevents the splint from adhering to the cutting-rolls. Fig. 11 is an enlarged detailed sectional view of the cutting and feed rolls, showing the manner in which the splints are separated. Fig. 12 is a broken enlarged plan of the feed-rolls. Fig. 13 is a detailed perspective view of the cam operating the slide-bars of the holding-frame. Fig. 14 is a perspective view of a spring used in adjusting the holding-frame. Fig. 15 is a sectional plan on the line XV XV of Fig. 16 of one of the holding-frames, and Fig. 16 is a cross-section on the line XVI XVI of Fig. 15.

The machine has a frame 10, which can be made in any appropriate design, although it should be made relatively high to provide for a divergence of the chutes in the magazine, as hereinafter described, and near the machine-top is a feed box or chute 11, in which are placed a series of veneer strips 12, which are packed closely together and with their edges against the box-bottom, these strips corresponding in width to the length of the splints to be cut. The veneer strips are pushed inward by the plunger 13, which is held in a case 15 at the outer end of the feed box or chute and is normally pressed inward by the spring 14. Obviously the feed box or chute may be of any necessary length, and weights of the usual kind can be substituted for the spring, or the veneer may be fed from a roll in the customary way, if preferred, the manner of feeding being not absolutely essential so long as the veneer is delivered to the cutting-rolls properly, as hereinafter described. The feed-box arrangement is, however, a preferred means, and the feed box or chute has at its inner end and in the bottom a slot 16, through which the strips 12 are fed one by one, each strip being pushed downward by a vertically-movable plunger 17, which moves between guide-rolls 18 on opposite sides of the frame, as best shown in Fig. 10, this plunger being pivoted to a walking-beam 19, which is pivoted to the frame 10, as shown at 20, and the outer end of which connects by rod 21 with a crank 22 on the rock-shaft 23, which is journaled transversely in the machine-frame and is operated by an arm 24, (see Figs. 1 and 6,) one end of which is fixed to the rock-shaft and the other straddles the cam 26, which is attached to the main driving-shaft 27, the arm 24 having rollers 25, (see Fig. 2,) which contact with the cam. The main shaft 27 is driven by a pulley 28, although it can be driven by any usual means. The cam 26 is shaped so as to cause the arm 24 and rock-shaft 23 to come to rest momentarily, for the purposes to be hereinafter described. It will be noticed that the tilting of the rock-shaft 23 will actuate the crank 22, connecting-rod 21, and walking-beam 19, so as to vertically reciprocate the plunger 17.

When the plunger 17 moves downward, it forces a veneer strip 12 into the cutting-rolls 29, which are arranged opposite one another, as shown best in Figs. 3 and 11, these being arranged just above the feed-rolls 30, which cause the cut splints to be delivered to the chutes or magazine, as presently described. The cutting-rolls 29 have circumferential parallel knives 31, and the knives of one roll overlap those of the other, as best shown in Fig. 9. It is necessary to grind these knives as illustrated, as if the bevel is all on one side the tendency is to slide the veneer laterally, so that the splints are not suitably discharged. This result is obviated by grinding the knives as shown in Fig. 9, where it will be seen that the knives of each pair have an opposite bevel, so that the shifting effect of one knife is neutralized by the other.

The splints 12ª as cut from the veneer by the knives 31, which are placed the width of a splint apart, have a tendency to follow the curvature of the cutting-rolls 29, and this is prevented by the strippers 32, which are formed on cross-bars 33 (see Fig. 10) and project upward in the form of brads or spurs to a point near the surface of the rolls 29 and between the knives 31. The splints are thus guided downward between the bars 33, as shown in Fig. 11. These cross-bars have inturned end flanges 34 to enable them to be secured to the machine-frame 10 and have inner guards 35, pointed at the top, each projecting upward between the rolls 29 near the ends of the rolls, so that if a strip of veneer happens to be a trifle long the extra splint or length is deflected by the guards 35 and prevented from clogging the rolls or chutes below.

As the splints 12ª are discharging from the cutting-rolls they pass between the feed-rolls 30 immediately below. These feed-rolls have circumferential ribs 37, which mesh as shown in Fig. 12, but which leave space between their outer edges and the surface of the opposite roll to permit the passage of a splint, as shown in Fig. 12. It will thus be seen that the splints are discharged by the feed-rolls in vertical and parallel rows, so as to enter the chutes or channels 38, which form a magazine and which are made in opposite sides of a transverse vertical web 39 on the machine-frame. The separation is rendered more sure by the dividing-plate 40, formed at the outer edge of the web 39, and in order that the splints may not clog in the chutes and that they may be seen in case any foreign matter gets into the chutes, so that it may be located, the outer faces of the chutes are covered by glass 42. (See Fig. 7.) These chutes 38 are of a width to loosely contain a splint, but are not sufficiently large to permit the splints to overlap, and so after the machine is run momentarily the chutes are filled with splints which lie endwise therein, the chutes being held end to end, and the chutes thus form a magazine from which the splints are fed to the holding mechanism below, as presently described. By reference to Fig. 2 it will be seen that the chutes diverge or spread as they near the bottom of the magazine, and they are made loose enough to permit the splints to drop readily through at the inclination shown. The object of this spreading of the chute is to bring the splints sufficiently far apart at their point of discharge to enable them to be held properly in a frame and dipped without making a bad head. It is understood that the splints should be held at least a quarter of an inch apart to prevent any malformation of the heads.

Obviously the cutting and feeding rolls can be run in any convenient manner. I have illustrated a good means. As shown, the cutting-rolls are geared together by the gears 43, (see Figs. 1 and 2,) and the feed-rolls are connected by gear-wheels 44. At one end one of the rolls 29 has a gear 45, meshing with a gear 46 on one of the feed-rolls 30, and the latter has also a beveled driving-gear 47, connected with a beveled gear 48 on the vertical shaft 49, which is journaled in brackets 50 on the side of the machine and forms and connects by beveled gears 51 and 52 with the driving-shaft 27. It will be observed, then, that the motion of the cutting and feed rolls is constant and continuous.

It is necessary to momentarily check the dropping of the splints from the magazine or feed-chutes while the holding-frame is being moved below, and to this end the chutes 38 are open at the bottom, and near the bottom of the chutes are spring-fingers 53, which swing into the chutes to stop the flow of splints. Each finger has an inturned end 54 to enter the chute, is preferably provided with a strengthening-coil 55, and is secured to a transverse rock-shaft 56. The journals of the rock-shaft project through the frame 10 of the machine, and at their outer ends have overlapping cranks 57, (see Fig. 6,) which connect with a spring 58, supported on the frame at a point above the shafts, and therefore the pressure of the spring is such as to normally tilt the shafts and swing the spring-fingers 53 inward into the chutes 38, so as to support the splints above. At a certain time it is necessary for the fingers to swing outward and permit the splints to drop, and to this end one of the shafts 56 has a tongue 59, (see Figs. 4 and 5,) extending upward into the path of a trip 60 on a disk 61, carried by the shaft 27. When the trip strikes the tongue 59, it turns the shaft 56 and also the connecting-shaft by reason of the two cranks 57, and the fingers 53 all swing out long enough to permit a match-splint to pass each one, by which time the trip 60 will have passed the tongue 59 and the fingers will have sprung back to place. In order that the splints may be carried positively downward into the holding-frame, rollers 62, preferably rubber-covered, are arranged opposite the lower parts of the chutes 38 and below the spring-fingers 53, these rolls being connected by gears 63, one of which connects through an intermediate gear 64 with a gear 65 on the driving-shaft 27. These rolls 62 therefore have a constant motion and carry the splints positively down into the holding-frame 66, which slides flatwise beneath the chutes 38.

The holding-frame 66 has transverse rows of vertical holes 67, each adapted to receive a match-splint. These holes are in each direction far enough apart to hold the splints the correct distance for dipping. Adjacent to each row of holes 67 is a transverse slide-bar 68, which is normally pressed outward by a spring 69, (see Fig. 15,) and which slide-bar has a series of yielding grippers 70, backed by cam-surfaces 71, and the grippers and the cams are adapted to slide back and forth so that the grippers will engage the splints 12ª in the holes 67. When the slide-bar is pushed inward, as shown in the lower part of Fig. 15, the grippers will be out of engagement with the splints, and the latter in such case fall through the holes 67, and when the spring 69 pushes out the slide-bar, as in the upper part of Fig. 15, then the grippers engage and hold the splints. These grippers 70, in the form of leaf-springs, have a lever action, growing stronger with increased pressure, as the splints are then drawn nearer the fulcrum.

When the frame 66 stops, as it does intermittently, as presently described, it brings two rows of the holes 67 below the magazine and in alinement with the two series of chutes 38, and during this stopping of the frame the fingers 53 swing back and the series of splints are driven down through the holes until they abut with the leveling-table 10ª, (see Fig. 3,) at which time the fingers 53 are swung back and the holding-frame advanced a distance to receive an extra supply of splints. In order that the slide-bars 68 may be pushed inward and the holes 67 opened at the correct time, the cam 72, (see Fig. 13,) attached to a plate 73, is fixed to the inside of the frame 10 at a point opposite the holding-frame 66 and below the chutes 38, (see Fig. 2,) so that as the frame passes this point the cam, acting on the slide-bars, opens the holes 67 to the free passage of splints, and when the frame 66 advances and passes the cam 72 the slide-bars spring out and bind the splints in place. It is obvious that a cam acting in this way can be arranged in any convenient manner in the path of the slide-bars.

To hold the frame 66 against lateral movement, the spring 74 is used, the free end of which presses against the side of the frame, (see Fig. 2,) the spring having an inturned end 75, which is secured to the frame 10. The pressure of this spring holds the frame 66 over and against an abutment 76, which is formed on the end of a shank 77, (see Fig. 2,) which is secured to the frame 10. The frame 66 slides through the machine on a series of rollers 78, which are journaled at suitable distances on the inner part and opposite sides of the frame 10. (See Figs. 2 and 3.) On one side of the frame 66 is a ratchet-bar 79, which engages a pawl 80 on the lower end of the frame 81, which extends downward from the rock-shaft 23, to which it is attached. It will be of course understood that this precise mechanism for moving the frame 66, or even the frame itself, is not of such a nature that it cannot be departed from, as any suitable holding-frame can be used in connection with the mechanism for cutting and feeding splints shown and described.

It will be clearly understood from the above description and by reference to the drawings, first, that the veneer may be fed to the machine in other ways without departing from the spirit of the invention; second, that the pitch of the chutes may be changed as desired, that other forms of cutting mechanism may be used, and it will be further seen, as has been found in practice, that the feed-rolls 30 are not absolutely essential, as the splints after passing through the cutting-rolls 29 naturally separate, as indicated by dotted lines in Fig. 11. The feed-rolls, however, make the separation surer.

It will be seen, further, that the frame 66 may be made of any necessary length and that, if desired, a whole series of the frames may be linked together, so as to pass through the machine, and the splints while held in the frame may be subjected to any of the usual automatic processes of dipping and discharging, thus making the machine continuous. This is so self-evident that there is no need of illustrating it.

The operation of the machine is as follows: The feed box or chute 11 is kept sufficiently full of veneer the strips of which are cut to uniform length, and then the revolution of the driving-shaft transmits a constant motion to the cutting and feed rolls 29 and 30 through the mechanism described, while the cam 26, acting on the arm 24 and the shaft 23, crank 22, connecting-rod 21, and walking-beam 19, reciprocates the plunger 17, which, being thus actuated, pushes strip after strip of the veneer down between the cutting-rolls 29. When the machine is first started, the spring-fingers 53 are held in momentarily until the chutes 38 can fill with splints, after which the operation is automatic. The splints are cut by the knives 31, as already described, and delivered endwise in the chutes 38. Supposing the chutes to be filled, the rotation of the driving-shaft causes the trip 60 and tongue 59 to tilt the rock-shafts 56 and swing out the spring-fingers 53, so that a series of splints are fed into two rows of holes 67 in the holding-frame 66. The cam 26 is shaped so that during this operation, which is instantaneous, the arm 24 and shaft 23 are at rest. As soon as the two series of holes are filled, however, the cam 26 acts on the arm 24 and tilts the rock-shaft 23, which works the plunger, as above described, and which also swings forward the arm 81, causing the pawl 80 to act on the ratchet-bar 79 and advance the holding-frame 66 a sufficient distance to bring two further series of holes beneath the feed-chutes 38.

Having thus described my invention, I claim as new and desire to secure by Letters Patent—

1. A match-machine comprising a magazine having a central web or body portion and a series of splint-chutes on opposite sides thereof, a splint-cutting device arranged to deliver complete splints simultaneously to both series of chutes, and holding mechanism to receive the splints as they are discharged from the chutes.

2. A match-machine comprising a magazine having a central web or body portion and a series of splint-chutes on opposite sides of said web, the web having a thinned upper edge to act as a divider of two rows of splints, and splint-cutting mechanism arranged to deliver complete splints into the chutes, substantially as described.

3. The combination with the magazine consisting of a central web having vertical splint-chutes on its opposite sides, of a splint-cutting device located above the magazine and arranged to discharge complete splints simultaneously into both series of chutes.

4. A match-machine comprising a magazine having a central vertical web with longitudinal splint-chutes on opposite sides thereof, a pair of rotary cutters having overlapping knives the width of a match-splint apart, said cutters being located above the magazine, means to feed veneer cards to said cutters, meshing feed-rolls between the cutters and the magazine, said feed-rolls being adapted to deliver the complete splints in two rows or series to the splint-chutes, mechanism for feeding veneer to the cutters, and holding mechanism to receive the splints from the magazine, substantially as described.

5. In a match-machine, the combination with the rotary cutters having oppositely-arranged and overlapping circumferential knives, of a stripping device consisting of bars supported beneath the cutters and parallel with their axes and to the stock-feed, and a series of spurs projecting upward from the bars between the knives of the cutters, substantially as described.

6. The combination with the rotary cutters having overlapping circumferential knives, of the parallel bars arranged below the cutters, the spurs projecting upward from the bars between the knives, and the guards as 35 at the ends of the bars projecting upward between the cutter rolls or shafts, substantially as described.

7. The combination with the splint-cutting mechanism adapted to deliver complete splints endwise, of the magazine located below the cutting mechanism and comprising a central vertical web having chutes on opposite sides, the chutes being adapted to receive the complete splints and diverging laterally toward the magazine-bottom, substantially as described.

8. The combination with the cutting mechanism adapted to deliver complete splints endwise, of the magazine located below the cutting mechanism and comprising a vertical web having chutes on opposite sides, the chutes being adapted to receive the complete splints and diverging laterally toward the magazine-bottom, and feeding or guiding mechanism to direct the splints in two rows or series to both series of chutes, substantially as described.

9. The combination with the splint-chutes, of the cross-shafts near the bottom of the chutes, a series of spring-fingers secured to the shafts and swinging simultaneously in and out of the chutes, and mechanism for working the shafts, substantially as described.

10. The combination with the cutting mechanism, the plunger to feed veneer to the cutting mechanism, the feed-chutes and fingers movable out and in in relation to the chutes, of the driving-shaft, and mechanism for working the plunger, the fingers and the holding-frame from the drive-shaft, substantially as described.

11. The combination with the feed-chutes of the oppositely-arranged rock-shafts having connecting spring-pressed cranks, a series of spring-fingers attached to the shafts and entering the feed-chutes, and means as the tongue on one of the shafts and its engaging trip for intermittently moving the rock-shafts and fingers, substantially as described.

12. The combination with the holding-frame having rows of perforations therethrough and the spring-pressed slide-bars in the frame, the said slide-bars having independent leaf-springs backed by cams thereon which are normally pushed across the perforations so as to grip splints therein, substantially as described.

WALLACE A. DOWNS.

Witnesses:
W. B. HUTCHINSON,
CHARLES J. HOEHNLE.